US008560386B2

(12) United States Patent
Badger et al.

(10) Patent No.: US 8,560,386 B2
(45) Date of Patent: *Oct. 15, 2013

(54) ONLINE MAP ADVERTISING (75) Inventors: Brandon Badger, Mountain View, CA (US); James E. Payne, Sunnyvale, CA (US); Michael S. Perrow, Pyrmont (AU)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,160

(22) Filed: Jun. 1, 2012

(65) Prior Publication Data

US 2012/0239509 A1 Sep. 20, 2012

Related U.S. Application Data

(63) Continuation of application No. 12/024,516, filed on Feb. 1, 2008.

(51) Int. Cl.
*G06Q 40/00* (2012.01)

(52) U.S. Cl.
USPC ...................................... 705/14.39; 705/14.4

(58) Field of Classification Search
USPC .......................................................... 705/14
See application file for complete search history.

(56) References Cited

U.S. PATENT DOCUMENTS

| | | |
|---|---|---|
| 2007/0083428 A1 | 4/2007 | Goldstein |
| 2007/0165050 A1 | 7/2007 | Baar |
| 2007/0233375 A1 | 10/2007 | Garg et al. |

FOREIGN PATENT DOCUMENTS

| | | |
|---|---|---|
| JP | 11296540 A | 10/1999 |
| JP | 2002049307 A | 2/2002 |
| JP | 2003131604 A | 5/2003 |
| JP | 200386233 A5 | 7/2005 |
| JP | 2006242583 A | 9/2006 |
| JP | 2007157047 A | 6/2007 |
| JP | 2007199921 A | 8/2007 |
| JP | 2010536056 A | 11/2010 |
| KR | 2006016832 A | 2/2006 |

OTHER PUBLICATIONS

Notification Concerning Transmittal of International Preliminary Report on Patentability for PCT/US2009/032696, dated Aug. 12, 2010, 6 pages.
European Patent Office Communication pursuant to Article 94(3) EPC, for EP Appl. No. 09 708 649.0-2221, dated May 5, 2011, 5 pages.
Supplementary European Search Report in App. Ser. No. 09708649.0, dated Apr. 13, 2011, 2 pages.
Official Journal EPO, Notice from the European Patent Office dated Oct. 1, 2007 concerning business methods, pp. 592-593, XP007905525.
European Patent Office Communication for EP Appl. No. 09 708 649.0-2221, dated Apr. 27, 2011, 2 pages.
European Patent Office Communication pursuant to Article 94(3) EPC, for EP Appl. No. 09 708 649.0-2221, dated Nov. 18, 2011, 4 pages.
Schaffer et al., "Navigating Hierarchically Clustered Networks through Fisheye and Full-Zoom Methods" ACM Transactions on Computer-Human Interaction, vol. 3, No. 2, Jun. 1996, pp. 162-188.
Patent Examination Report No. 1 for AU2009212748 dated Dec. 11, 2012, 3 pages.
Notice of Reasons for Rejection for JP Appl. No. 2010-545220 dated Dec. 18, 2012 (w/ English Translation), 5 pages.

*Primary Examiner* — Thomas M Hammond, III
(74) *Attorney, Agent, or Firm* — Fish & Richardson P.C.

(57) ABSTRACT

Systems and methods for selecting advertisements for presentation in a map space are disclosed. Map requests are received, map spaces identified, advertisement bids are received for advertisement space within the map spaces, and advertisements are selected for presentation in the map space based on the advertisement bids. The advertisement bids can be selected through an auction.

30 Claims, 7 Drawing Sheets

ONLINE MAP ADVERTISING

CROSS-REFERENCE TO RELATED APPLICATIONS

This application is a continuation application of, and claims priority to, U.S. patent application Ser. No. 12/024,516, entitled ONLINE MAP ADVERTISING, to inventors Badger et al., which was filed on Feb. 1, 2008. The disclosure of the foregoing application is incorporated herein by reference in its entirety.

BACKGROUND

This document relates to information presentation.

The rise of the Internet has facilitated easy access to information for millions of people. Some website publishers freely publish their content to increase the number of visitors to their respective websites. For example, some news organizations freely provide news coverage to visitors of their respective websites; and some entertainment related websites freely provide entertainment articles and stories to visitors of their respective websites; etc.

To generate revenue, these publishers sell space (e.g. to be populated with sponsored content (e.g., advertising)) on their websites to derive income. For example, in an advertisement syndication model, advertisers can extend their marketing reach by distributing advertisements to publishers. The publishers can place advertisers' text, video or image advertisements on web pages that have content related to the advertisement. As the users are likely interested in the particular content on the publisher webpage, they may also be interested in the product or service featured in the advertisement. Accordingly, such targeted advertisement placement can help drive online customers to the advertiser's website, which, in turn, can generate revenue for the publishers.

One service that publishers can include in a website is online map service. Some of these conventional services provide maps that are very sophisticated and allow users to view traditional street maps, street maps including representations of the actual buildings, and even satellite images. The use of online maps has increased dramatically in recent years.

SUMMARY

Systems, apparatus, computer program products and methods for selecting content items (e.g., advertisements) in a map space are disclosed. In one implementation, map requests for map data including viewport data can be received, the map space being a subset of a map. Content item spaces can be identified for presenting advertisements in the selected map space, the content item spaces being defined by border spaces in the map. Content item bids can be received based on the viewport data, which can include a zoom level and display region. An auction of the map space can be performed based on the content item bids and one or more content items can be identified for presentation based on the auction results.

In another implementation, a map space can be identified in a map, the map space being a portion of the map for presentation on an electronic (e.g., computer) device. The identified map space can be auctioned for one or more content items. Then one or more content items can be identified for presentation in the map space based on the auction results.

In yet another implementation, a system can include a map server; a map store; and a content server. The map server is configured to receive map requests from publishers and/or users and retrieve the corresponding map space from the map store based upon the selected zoom level and selected display region. The content server is configured to receive, for example, advertisements and advertisement bids from advertisers, track advertising statistics, perform auctions of advertisement space, and select advertisements for presentation in map spaces. Other implementations include corresponding systems, apparatus, and computer program products.

These and other implementations can optionally include one or more of the following features. Map direction data can be received including one or more start locations, end locations, and path data, and content items can be selected that are relevant to the start location, end location, and path data. Content item bids can be received that are constant for all zoom levels greater than a threshold. Alternatively, content item bids can be selected based on a selected zoom level and selected display region and content item bids can be precluded if the zoom level is less than the threshold.

These various optional advantages and features can be separately realized and need not present in any particular implementation. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
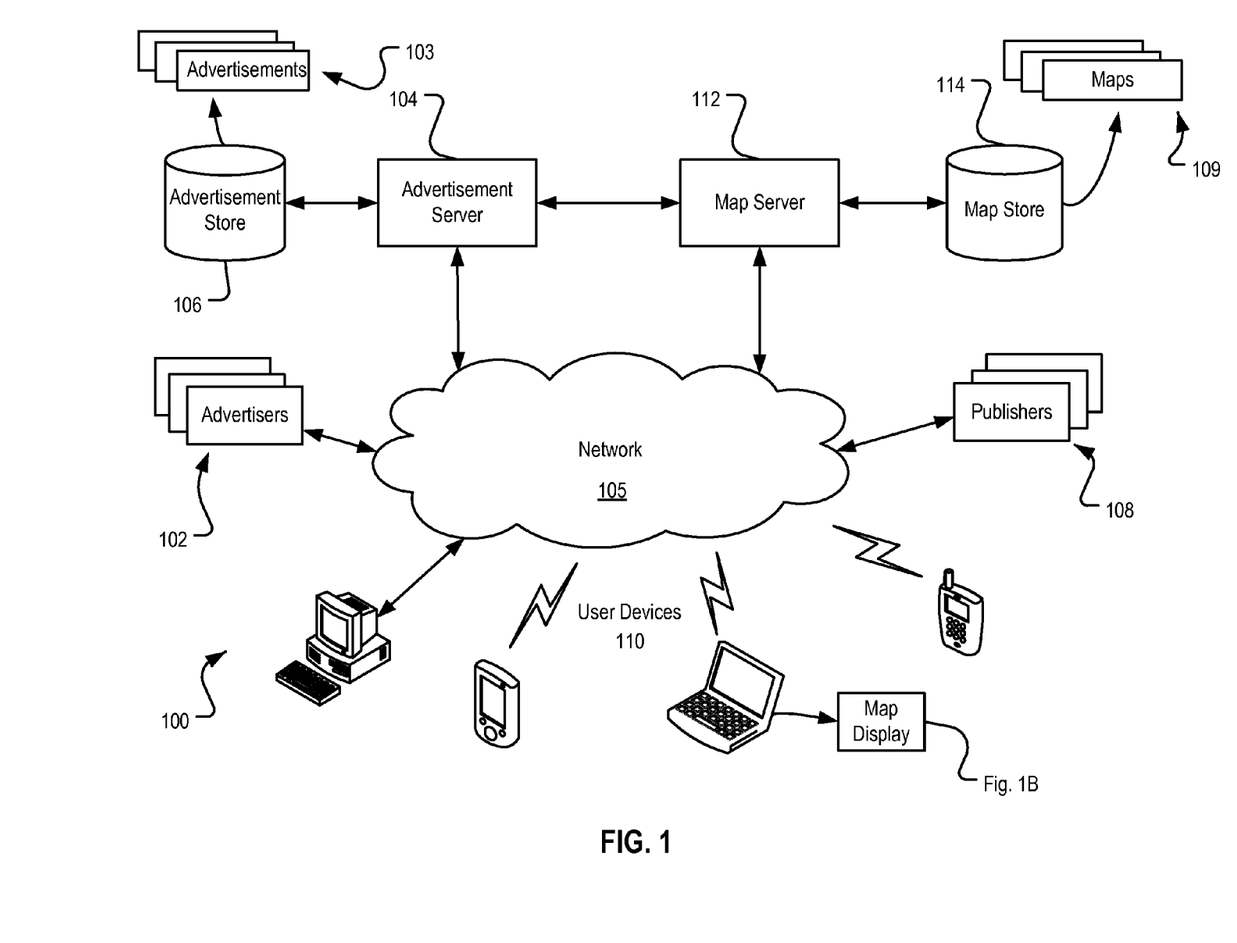
FIG. 1 is a block diagram of an example online map advertising environment 100.

FIG. 1 is a block diagram of an implementation of an example online map advertising environment 100. In some implementations, advertisers 102 can connect to an advertisement server 104 to upload advertisements 103, track advertising statistics, bid for advertising space, or otherwise interact with the advertisement server 104. The advertisers 102 can connect to the advertisement server 104 through the network 105. The network 105 can be a wide area network, local area network, the Internet, or any other public or private network, or combination of both. While reference is made to an advertisement server 104, other content servers can be implemented in the environment 100.

The advertisements 103 (e.g. content items) may be in the form of graphical advertisements (e.g., banner advertisements), text only advertisements, image advertisements, audio advertisements, video advertisements, advertisements combining one of more of any of such components, etc. The advertisements may also include embedded information, such as links, meta-information, and/or machine executable instructions. The advertisements 103 can be formatted for presentation in maps 109. The advertisements 103 can be stored in an advertisement store 106 that is connected to the advertisement server 104. While reference is made to advertisements, environment 100 can deliver other forms of content items including other forms of sponsored content.

Publishers 108 can be network content providers that publish websites. The publishers 108 receive requests for content from the user devices 110 and present content in response to the requests. In response to requests, the publishers 108 can include maps 109 with the content, thereby allowing the user devices 110 access to maps 109 through the publisher's website. User devices 110 can connect to the publishers' websites through the network 105 utilizing any device capable of communicating in a computer network environment, and displaying retrieved information, for example, a web-enabled handheld device, a mobile telephone, a set top box, a game console, a personal digital assistant, a navigation device or a computer.

In some implementations, the publishers 108 can include a map 109 with the requested content by requesting the map 109 from the map server 112. In response to the map request by the publisher 108, the map server 112 selects data for the requested map 109 from the map store 114 for presentation.

The request for a map 109 can also include or generate a request for advertisements 103. In these implementations, the map server 112 can request advertisements 103 from the advertisement server 104. The advertisements 103 selected for delivery to the map server 112 can be selected based on their association with the map 109 selected by the map server 112. For example, the advertisements 103 can be associated with the map 109 if the advertiser 102 has a retail location within the map 109 selected.

In some implementations, the request for a map 109 includes a request for advertisements 103, and the advertisements 103 are delivered to the map server 112 by the advertisement server 104. The map server 112 integrates the advertisements 103 into the map 109 by placing the advertisements 103 on the map 109. The advertisements 103 can be placed on the map 109 at a location representative of the location associated with the advertiser 102 (e.g., a map of the retail location of the advertiser). The advertisements 103 can be placed on the map 109 by embedding the advertisement 103 in the map 109, e.g., rendering the advertisement 103 as part of the map 109. In this implementation, the advertisements 103 are subject to any changes affecting the display of the map 109. For example, if the map 109 is displayed at a higher zoom level, the advertisements 103 that are rendered as part of the map 109 will also be displayed at the higher zoom level.

Alternatively, the advertisements 103 can be placed on the map by presenting the advertisements 103 as overlays on the map 109. When the advertisements are presented as overlays on the map 109, they are maintained in a separate file and do not become part of the map 109. Therefore, the characteristics of the advertisements 103 are independent of the characteristics of the map 109 and a change affecting the display of the map 109 will not necessarily affect the display of the advertisement 103. For example, if the map 109 is displayed at a higher zoom level, the advertisement 103 will not necessarily be displayed at the higher zoom level.

An example publisher 108 that may present a map 109 with other content is a general content website publisher that receives requests for information associated with a geographic location. The example publisher 108 can provide, for example, movie listing information and a list of theatres that are showing the movies in a geographic location. Additionally, the publisher 108 can include a map 109 on the web page that shows the location of the theatres relative to a specified location. The publisher 108 can request the map 109 from the map server 112. The map server 112 responds by providing the requested map 109.

The publisher 108 and/or map server 112 can also request that advertisements 103 be included in the map 109. If the map request includes a request for advertisements 103, the map server 112 requests advertisements 103 associated with the map 109 for presentation in the map 109. The map 109 presented to the user device 110 will include the requested map and advertisements 103 associated with the map 109, as illustrated in FIG. 2A.

Figure 2A:
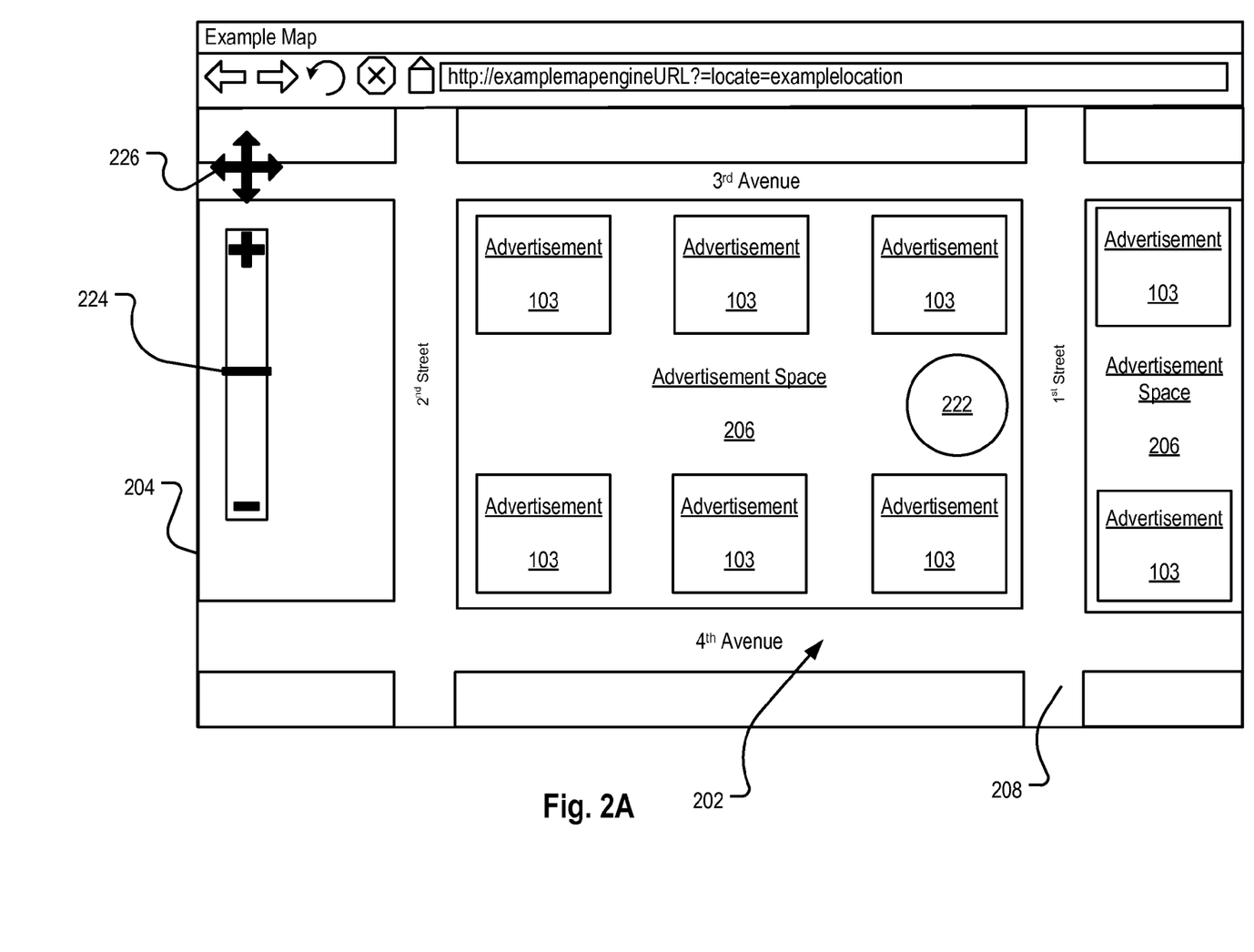
FIG. 2A is an example of a web page that displays advertisements in a map space.

FIG. 2A is an example of a web page that displays advertisements 103 in a map space 202. The map space 202 is the portion of the map 109 selected by the map server 112 that can be displayed on a user device 110. In some implementations, the map space 202 is defined by a display region 204 and a zoom level. The display region 204 is the portion of the user's display that is allocated to present the map spaces 204. In other implementations, the map space 202 can be further defined by a central point. The central point can be the location of interest (e.g., city center, destination, store location, etc) or any other point within the map space that serves as a reference point.

The map space 202 includes advertisement spaces 206. The advertisement spaces 206 are subsets of the map space 202 that are available for presenting advertisements 103. In some implementations, the advertisement spaces 206 are defined by the road spaces 208. For example, in FIG. 2A, an advertisement space 206 can be the subset of the map space 202 that is bordered on all sides by road spaces 208. Alternatively, advertisement spaces 206 can be the spaces bordered by a combination of road spaces 208 and the borders of the display region 204. The advertisement spaces 206 can vary with the display region 204 and zoom level of the map space 202 and can define the number of advertisements 103 that can be presented in a particular map space 202, as will be discussed. In addition to road spaces 108, other map components can be used to define advertisement spaces 206 (e.g., water, parks, airports, hospitals, etc). While reference is made to advertisement spaces 206, other content item spaces can be defined in the map space 202.

The display region 204 can vary according to a number of factors including display device limitations, user preferences, and publisher preferences, etc. In the example shown, the display region 206 is defined by the size and resolution of the display device. For example, a desktop computer with a 21 inch display and 1280×768 resolution can display more of a map 109 than a web-enabled handheld device having a 3 inch display and 240×240 resolution. Accordingly, the map space 202 that is selected for presentation to different user devices 110 will likely be different when the display region 204 and resolution of each user device 110 is different.

Additionally, user preferences can affect the display region 204 available to present map spaces. User devices 110 can have user preference settings that define the display region 204 and resolution. For example, a user device 110 displaying a web page on a 21 inch display device can have a limited display region 204 if the application window containing the display region 204 is resized to occupy less than the entire display. Similarly, if the user device 110 is displaying multiple windows within the 21 inch display or otherwise is not maximizing the window displaying the web page, the display region 204 may be limited. The user device 110 can also be configured by the user to operate at a lower resolution than the maximum available resolution, resulting in less information being displayed.

Figure 2B:
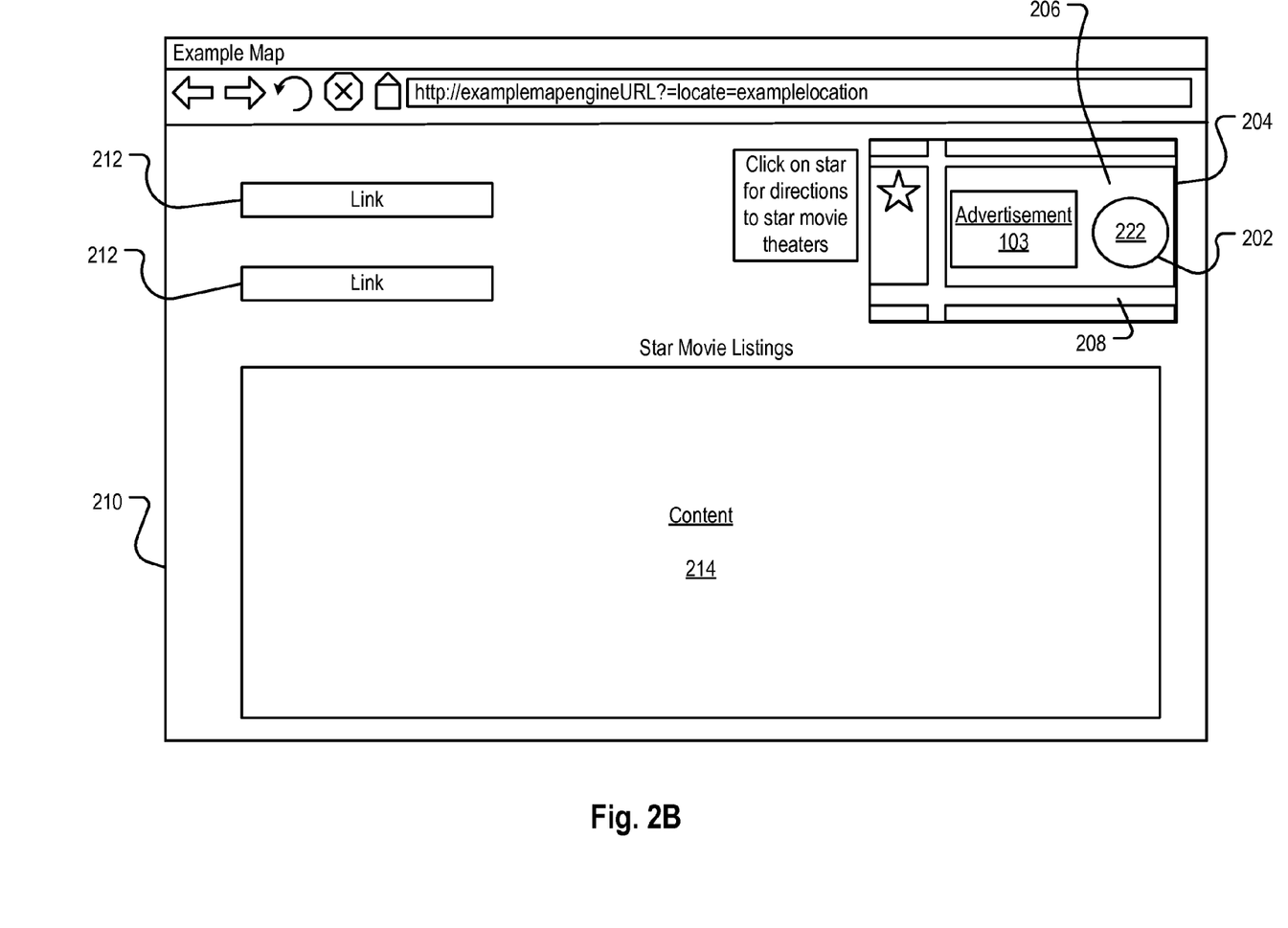
FIG. 2B is an example of a map space incorporated into a general content website.

Further, the display region 204 can vary according to publisher preferences. Publishers 108 design web pages to incorporate map spaces according to design specifications that enable a variety of information to be displayed on a single page (e.g., content, advertisements, links, etc). Accordingly, the portion of each web page allocated for displaying the map space 204 may vary according to the display region defined in the design specifications and allocated by the publishers 108. For example, a publisher 108 that publishes web pages dedicated to displaying maps may allocate a large portion of the web page as the display region 204, as shown in FIG. 2A, while utilizing a small portion of the display for other information such as hyperlinks to other web pages. An example of a publisher 108 that will allocate a large portion of the web page to displaying maps is a map service. In contrast, a publisher 108 that publishes general content web pages my be more inclined to allocate a much smaller portion of the web page as the display region 204 since the map space 202 is only a portion of the information that the publisher 108 is presenting, as shown in FIG. 2B. FIG. 2B is an example of a map space 202 incorporated into a general content website. The display region 204 allocated to display the map space 202 is only a portion of the available display region 210. Therefore, even though a larger display region 204 could be realized, the publisher preferences have limited the display region 204.

An example of a publisher 108 that may allocate a small portion of the web page to display a map 109 is a syndicated map publisher, e.g., movie theatre with a small map of the theatre location on the web page. The map 109 is only a portion of the information that the syndicated map publisher is attempting to provide, so the space on the web page allotted to displaying the map 109 will be smaller. For example, as illustrated in FIG. 2B, the syndicated map publisher may have links 212 to other websites and other content 214 that occupy a large portion of the available display region 210. This leaves a smaller portion of the available display region 210 available for presenting the map space 202.

Figure 2C:
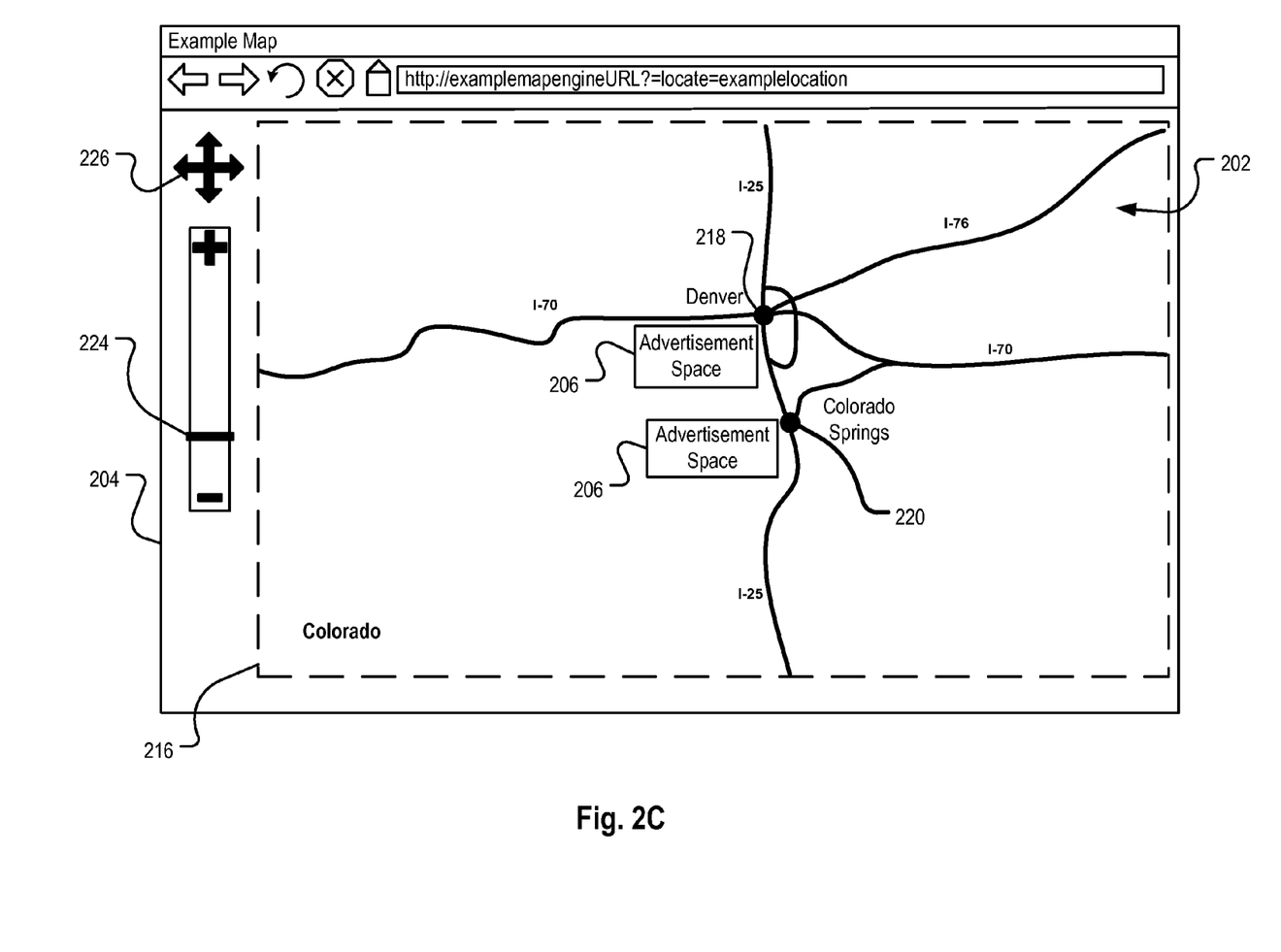
FIG. 2C is an example of a map space presented at a low zoom level.

FIGS. 2A-2C illustrate that the advertisement space 206 for a particular geographic region is defined by the display region 204 and the zoom level associated with the map space request. When a smaller display region is available, less advertisement space 206 will be available. Less available advertisement space 206 can result in fewer advertisements 103 being displayed in the map space 202. For example, in FIG. 2A since the display region 204 is a larger portion of the web page than the display region 204 of FIG. 2B, more advertisements 103 can be displayed in the map space 202 of FIG. 2A. In some implementations, to determine the number of advertisements 103 to include in a particular map space 202 the size of the display region 204 is considered.

The map space 202 selected by the map server 112 is defined in part by the zoom level selected by the user device 110. Similarly, the number of advertisements 103 presented in the map space 202 can also be defined in part by the zoom level submitted by the user devices 110. The zoom level defines the level of map detail displayed in the map space 202. Each map space request received by the map server 112 includes a zoom level parameter defining the level of detail for the map 109.

For example, if the map space request includes a zoom level parameter that results in a city block being displayed in the display region 204, then a significant amount of detail will typically be included in the map space 202 (e.g. all roads prominently displayed). The map space 202 of FIG. 2A displays a full city block and portions of the surrounding city blocks. At this zoom level, the advertisement spaces 206 can occupy a large portion of the display region 204. As shown, a number of advertisers 102 associated with this city block can have advertisements 103 presented in the map space 202.

In contrast, if the map space request includes a zoom level that enables the entirety of a state to be included in the display region 204, then typically little detail will be included in the map space 202 (e.g., state lines, major highways, and larger cities). FIG. 2C is an example of a map space 202 presented at a low zoom level. The map space 202 of FIG. 2C displays the entire state of Colorado 216. At the selected zoom level the cities of Denver 218 and Colorado Springs 220 are represented on the map by dots. Since each of these cities occupy a small portion of the display region 204, the advertisement spaces 206 associated with these cities can similarly occupy a small portion of the display region 204.

In some implementations, the advertisement server 104 can identify the number of advertisements 103 for presentation in the advertisement spaces 206 based on the selected zoom level and display region 204. The number of advertisements 103 identified for presentation will depend not only on the available advertisement space 206 but also on the size of each advertisement 103. The size of each advertisement 103 can be defined by the advertisement server 104 (e.g., by requiring advertisements 103 submitted by advertisers 102 to have specific dimensions). The advertisement server 104 can also scale advertisements 103 to a uniform size. Alternatively, the advertisement server 104 can use the size of the advertisement 103 as a factor when identifying advertisements 103 for presentation.

User devices 110 can interact with the map server 112 over the network 105 by using map websites, such as Google Maps, and other map programs, such as Google Earth. Utilizing these services the user devices 110 can request maps 109 from the map server 112 through various query or browsing methods. For example, user devices 110 can search a particular address or business by directly entering the name of the business or address into a search interface. In this scenario, the map space 202 presented in response to the search can identify the location 222 of the address or business searched, as well as present one or more advertisements 103 within the map space 202.

The user devices 110 can request additional map spaces 202 by entering other queries, using the zoom control 224 to zoom in and zoom out, or using the direction control 226 to directionally pan. For example, as illustrated in FIG. 2C, the user device 110 can submit a new search request for a map of Colorado 216. The corresponding map space 202 presented can have a lower zoom level so that the entire state of Colorado will be displayed in the display region 204.

Similarly, user devices 110 can browse map spaces 202 without first conducting a search by using the zoom control 224 to zoom in and out, and the direction control 226 to directionally pan through the map spaces. User devices 110 requesting map spaces in browse mode can, for example, begin with a default map space 202 presented by the publisher 108, map service or map program that displays a map space including the entire world. The user devices 110 can submit zoom requests to retrieve a map space 202 that displays more detail about the area that they are interested in.

For example, if a user device 110 is initially presented with a map space 202 that presents a map of the world, the user device 110 can submit a new map space request by sliding the zoom control 224 to a higher zoom level, resulting in the presentation of a map space 202 showing Colorado 216, as illustrated in FIG. 2C. To receive an even more detailed map space 202, the user device 110 can submit additional zoom requests using the zoom control 224, and pan requests using the directional control 226 to receive the map space 202 of FIG. 2A. Thus, each zoom instruction and directional pan initiated by the user device 110 corresponds to a new map space request and, in turn, the presentation of another map space 202. Additionally, the new map space request may also result in the selection of new advertisements 103 associated with the map space 202.

As discussed above, the size of the advertisement spaces 206 in each map space 202 can be a factor in determining the number of advertisements 103 to be presented. Further, it is likely that more advertisements 103 will be available for presentation than can be presented in the map space 202. This is particularly true when a map space 202 is presented at a low zoom level because the advertisement space 206 for the region will be smaller (e.g. FIG. 2C). Therefore, in addition to identifying the number of advertisements 103 for presentation in the map space 202, the advertisement server 104 can also identify advertisements 103 for presentation in the map space 202. In one implementation, the identification process can be completed by auctioning the map space 202 to the advertisers 102.

In some implementations, the advertisers 102 can access the advertisement server 104 and submit advertisement bids for the map spaces. For example, the advertisers 102 may be permitted to select, or bid, an amount the advertisers 102 are willing to pay for each presentation of or interaction with (e.g., click) an advertisement 103, e.g., a cost-per-click amount an advertiser pays when, for example, a user device 110 clicks on an advertisement 103. The cost-per-click can include a maximum cost-per-click, e.g., the maximum amount the advertiser 102 is willing to pay for each click of an advertisement 103 based on a keyword, e.g., a word or words in a query. Other bid types, however, can also be used. While reference is made to advertisement bids, other content item bids can be used to auction content item space.

Additionally, since the available advertisement space 206 can vary according to the selected display region and the selected zoom level, the advertisement bids can similarly vary according to display region and zoom level. Therefore, an advertiser 102 can submit an advertisement bid including a zoom level parameter and a display region parameter to identify the particular map space 202 that the advertiser 102 is bidding on.

For example, an advertiser 102 that wants an advertisement 103 presented in the map space 202 of FIG. 2A can submit a bid including a zoom parameter and display region parameter associated with this map space 202. The same advertiser 102 may not be as interested in having an advertisement 103 presented in the map space 202 of FIG. 2C and therefore, can submit a lower or no bid including a zoom parameter and display region parameter associated with this map space 202. Thus, associating a zoom parameter and display region parameter with each bid enables the auction to be conducted according to bids associated with the particular map spaces 202 that are presented, rather than auctioning each map space 202 to the same group of bidders and associated bids.

In some implementations, a threshold zoom level can be defined for an advertisement 103. For zoom levels above the threshold zoom level, advertisement bids are considered in the auction. Conversely, for zoom levels below the threshold zoom level, advertisement bids are not considered.

For example, some businesses cater to customers in a relatively small geographic area and only want an advertisement 103 presented if a user device 110 is accessing a map space 202 at a high zoom level (e.g., FIG. 2A). Therefore, the advertisement server 104 can receive an advertisement bid from a business associated with a zoom level corresponding to the geographic area that the business serves. When the advertisement server 104 conducts the auction for map spaces 202 having zoom levels less than the threshold zoom level (e.g., FIG. 2C) the advertisement bid submitted by the business is not considered in the auction. Once a map space is presented having a zoom level greater than the threshold the advertisement bid for the business will then be part of the auction. In some implementations, the advertisement server 104 can be configured to accept advertisement bids associated with a threshold zoom level that are constant. In other implementations the advertisement server 104 can be configured to accept advertisement bids associated with a threshold zoom level that vary in proportion to the zoom level, or are input for each zoom level.

The advertisement server 104 can select the winning bid or bids based on the advertisement bids submitted by the advertisers 102. If the advertisement bids are the only criteria considered, the highest bidders will be selected for presentation in the map space 202. However, user specific data can also be considered to facilitate identification of the advertisements 103 selected for presentation in the map space 202. For example, user specific data can be utilized to customize the advertising for a particular user device 110.

One type of user specific data is map direction data. Map direction data can be available if a user device 110 or publisher 108 requests driving directions from the map server 112. The map server 112 can respond by providing the user device 110 with turn by turn driving directions describing a path from a start location to an end location. The start location, end location and path data can facilitate selection of advertisements 103 relevant to the user devices 110 by correlating the start location, end location, and path data to a trip purpose and potential interests.

For example, if a user device 110 requests driving directions from Atlanta to Orlando, the user device 110 might be interested in gas stations near the start location, restaurants along the path, and hotels near the end point. Therefore, the advertisement server 104 can give preference to the advertisement bids associated with these businesses when auctioning the advertisement spaces 206 along the path. Similarly, if a user device 110 requests directions from a residential location to a commercial location such as a movie theater, this request can indicate that the user might be interested in other commercial locations near the end point, such as a coffee shop or restaurant. In this situation, the advertisement server 104 can give preference to the advertisement bids associated with these businesses when the advertisement space 206 is auctioned.

The advertisement server 104 can also consider the quality of each advertisement 103 when auctioning the advertisement space 206. The quality of the advertisements 103 can be determined by user response to the advertisement 103 (e.g., click-through rate) the physical characteristics of the web page (e.g., text size, number of pictures, etc), or whether the advertiser 102 is related to the map space 202 to be presented (e.g., a retail location in the map space 202), to name a few.

Publishers 108 can report user interaction with an advertisement 103 to the advertisement server 104 and statistics can be maintained to determine interactions with (e.g., the click-through rate) of a particular advertisement 103. If a particular advertisement 103 is not clicked on very often, it may be an indication that either the advertisement 103 is not related to the map space 202 presented, or that it is a low quality advertisement 103. The advertisement server 104 can use these statistics as factors in determining future auction winners. For example, the advertisement server 104 can ignore advertisement bids from advertisers 102 that are associated with advertisements 103 that have extremely low click-through rates. Alternatively, the advertisement server 104 can select an advertisement bid from an advertiser 102 associated with an advertisement 103 having a high click-through rate over a higher advertisement bid from an advertiser 102 associated with an advertisement 103 having a low click-through rate.

The click-through rate can be normalized to account for the placement of the advertisement 103 on the map space 202. For instance, an advertisement 103 can appear anywhere in the map space 202, and it is less likely that an advertisement 103 placed on the edge of the map space 202 will be clicked on because the main area of interest may be the middle of the map space 202. Therefore, the placement of the advertisement 103 within the map space 202 can be considered when determining quality based on click-through rate. Additionally, the type of advertisement can also be considered when determining ad quality. For example, it may not be likely that a gas station will have a high click-through rate since most users are familiar with the services and products available at a gas station and the benefit of the advertisement 103 is to know the location of the gas station. Therefore, the quality measures can also be normalized by industry.

In addition to click-through rates, many landing page characteristics (e.g., font sizes, number of pictures, etc) can be identified by web crawlers. Landing pages are web pages that a user device 110 is directed to in response to clicking on an advertisement 103. The web crawler can identify characteristics of the landing page, e.g., the text font on the web page and the number of pictures that are displayed on the web page. These landing page characteristics can be associated with the quality of the landing page and used to generate a quality score for the landing page. For example, if a landing page is published in a very small font size, or having no pictures, it may not be rated as highly as a landing page having a larger font size and a specified number of pictures.

The quality score can be used as a factor to determine auction winners. For example, if the highest bid in an auction is associated with a landing page having a quality rating that does not satisfy a quality threshold then the bid associated with that landing page may be ignored. Similarly, if a single winning bid must be selected from two or more equal bids, then the bid associated with the landing page having a higher quality rating may be selected as the winning bid.

The advertisement server 104 can also consider whether the advertisement 103 is related to the advertisement space 206 being auctioned. Geographic locations of businesses can be used to determine whether an advertiser 102 is related to a particular map space 202. For instance, if an advertiser 102 bids on a particular advertisement space 206, but the advertiser 102 does not have an address associated with the advertisement space 206, then the advertisement server 104 can ignore the bid, preventing the advertisement 103 from being presented in the advertisement space 206.

The advertisement server 104 can also be implemented to identify the advertisements 103 that should be excluded from a given map space 202. The advertisement server 104 can define advertisement exclusion zones and prevent excluded advertisements from being presented within particular advertisement spaces. Advertisement exclusion zones are areas within the advertisement spaces 206 where excluded advertisements will not be presented regardless of the value of the advertisement bid associated with it. For example, if Company Y is located in a requested map space 202, but their competitor Company Z is not, the advertisement server 104 can define the advertisement space 206, where Company Y is located, as an advertisement exclusion zone and identify Company Z's advertisements as excluded advertisements for this advertisement exclusion zone.

Information used to define the advertisement exclusion zone can include the addresses of businesses as listed in the phone book and a categorization of businesses by industry and market. Additionally, advertisers 102 and other businesses may be allowed to submit information regarding their respective industries to assist the definition of appropriate advertisement exclusion zones.

Figure 3:
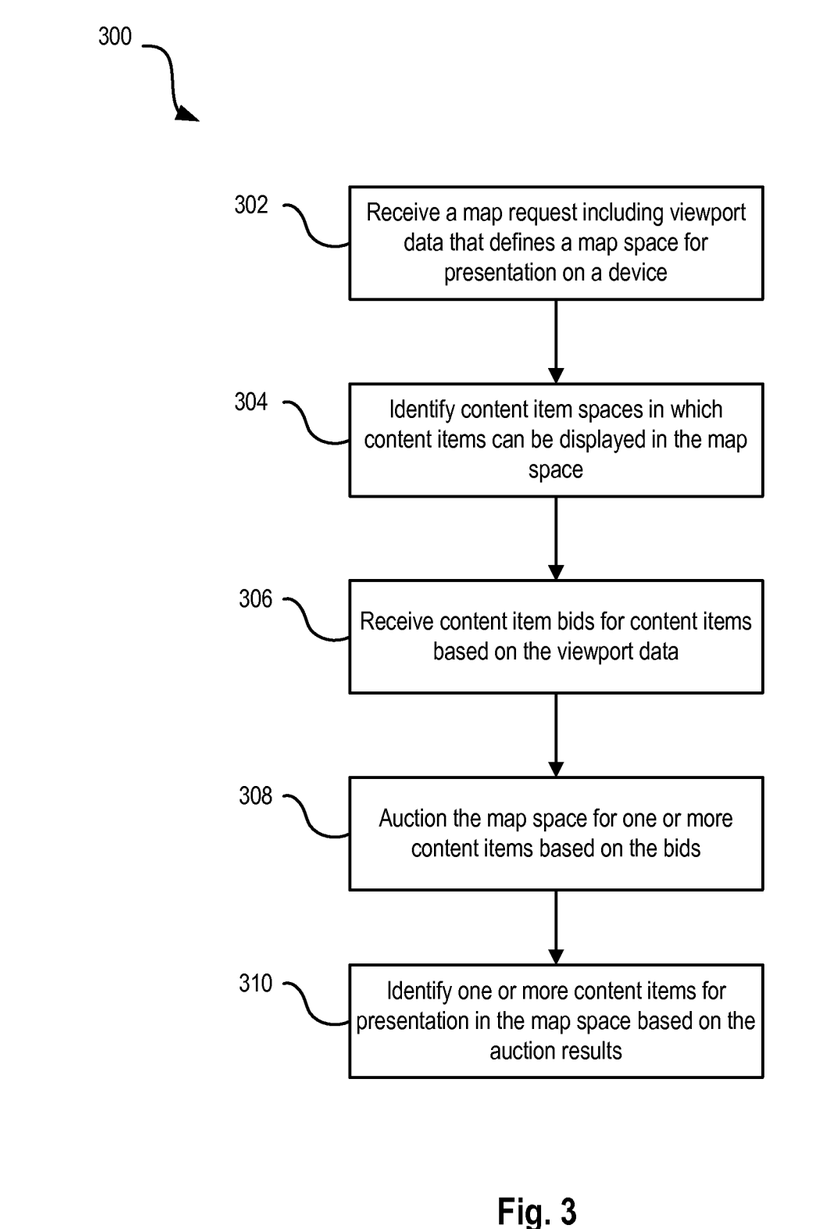
FIG. 3 is a flowchart illustrating an implementation of an example process for selecting advertisements for a map space.

FIG. 3 is a flowchart illustrating an implementation of an example process 300 for selecting content items for a map space. The process 300, for example, can be implemented in the environment 100.

Stage 302 receives a map request including viewport data that defines a map space for presentation on a device. A viewport is the area of the display that displays the map space 202. For example, a web page can have a portion of the display allocated to textual information, such as driving directions or address information, while a portion is allocated to displaying the map space 202 within the viewport. Therefore, the map request can include information regarding the size of the viewport to facilitate retrieval of a map space 202 that corresponds to the viewport size.

Stage 304 identifies content item spaces in which content items can be displayed in the map space. In some implementations, the content item spaces are advertisement spaces 206 that can be identified as subsets of the map space 202 that are bounded by road spaces. An example advertising space is a city block. The roads that bound the city block can define an advertising space in the map space 202. Advertisement spaces 206 can be identified, for example, by the advertisement server 104.

Stage 306 receives content item bids for advertisements based on the viewport data. The viewport data can include zoom level data and display region 202 data. The content item bids can be advertisement bids that can correspond to sets of zoom level data and display region data. Alternatively, a bid and a threshold zoom level can be received. The threshold zoom level prevents the advertisement bid from being considered in an auction for map spaces 202 having a selected zoom level lower than the threshold. The advertisement bids can be received, for example, by the advertisement server 104.

In some implementations, the viewport data can be inferred from previous user interactions. In these implementations, for example, the threshold zoom level can be inferred from click-through rates associated with the zoom levels based on a threshold click-through rate. In turn, the zoom level associated with the threshold click-through rate can be identified as a minimum threshold zoom level associated with all bids. When a bid is received without a specified zoom level, the advertisement server can include the minimum threshold zoom level with the advertisement bid. The advertiser can be allowed to override the minimum threshold zoom level.

Stage 308 auctions the map space for one or more content items (e.g. advertisements) based on the content item bids (e.g., advertisement bids). The auction can also be based on other factors such as advertisement quality or user specific data. The auction can be performed, for example, by the advertisement server 104.

Stage 310 identifies one or more content items (e.g., advertisements) for presentation in the map space based on the auction results. The number of advertisements selected for presentation can be determined based on the available advertisement space 206 in the map space 202. The advertisements can be selected for presentation based on a requested zoom level and a requested display region 202. The advertisement server 104, for example, can identify the one or more advertisements for presentation.

Figure 4:
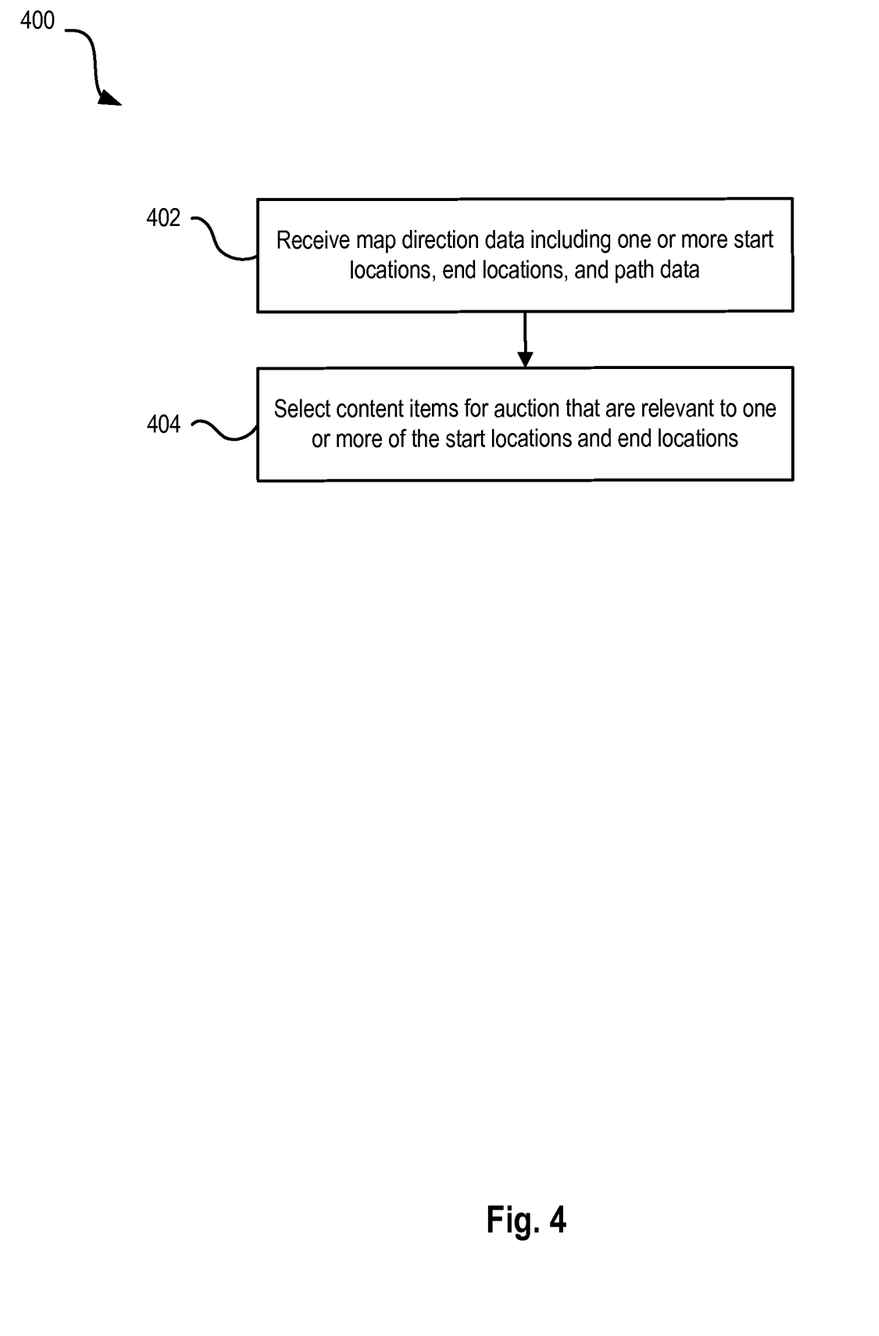
FIG. 4 is a flowchart illustrating an implementation of an alternate example process for selecting advertisements for a map space.

FIG. 4 is a flowchart illustrating an implementation of an alternate example process 400 for selecting advertisements for a map space. The process 400, for example, can be implemented in the environment 100 and can be implemented in conjunction with process 300.

Stage 402 receives map direction data including one or more start locations, end locations, and path data. The map direction data can be generated, for example, by the map server 112 in response to a request from a user devices 110 or publisher 108. The map direction data can be received, for example, by the advertisement server 104.

Stage 404 selects content items (e.g., advertisements) for auction that are relevant to one or more of the start location, path and end location. The advertisements can be considered relevant if the businesses associated with the advertisements are located near the start location, end location or otherwise near the path identified by the path data. The advertisements for auction can be selected, for example, by the advertisement server 104.

Figure 5:
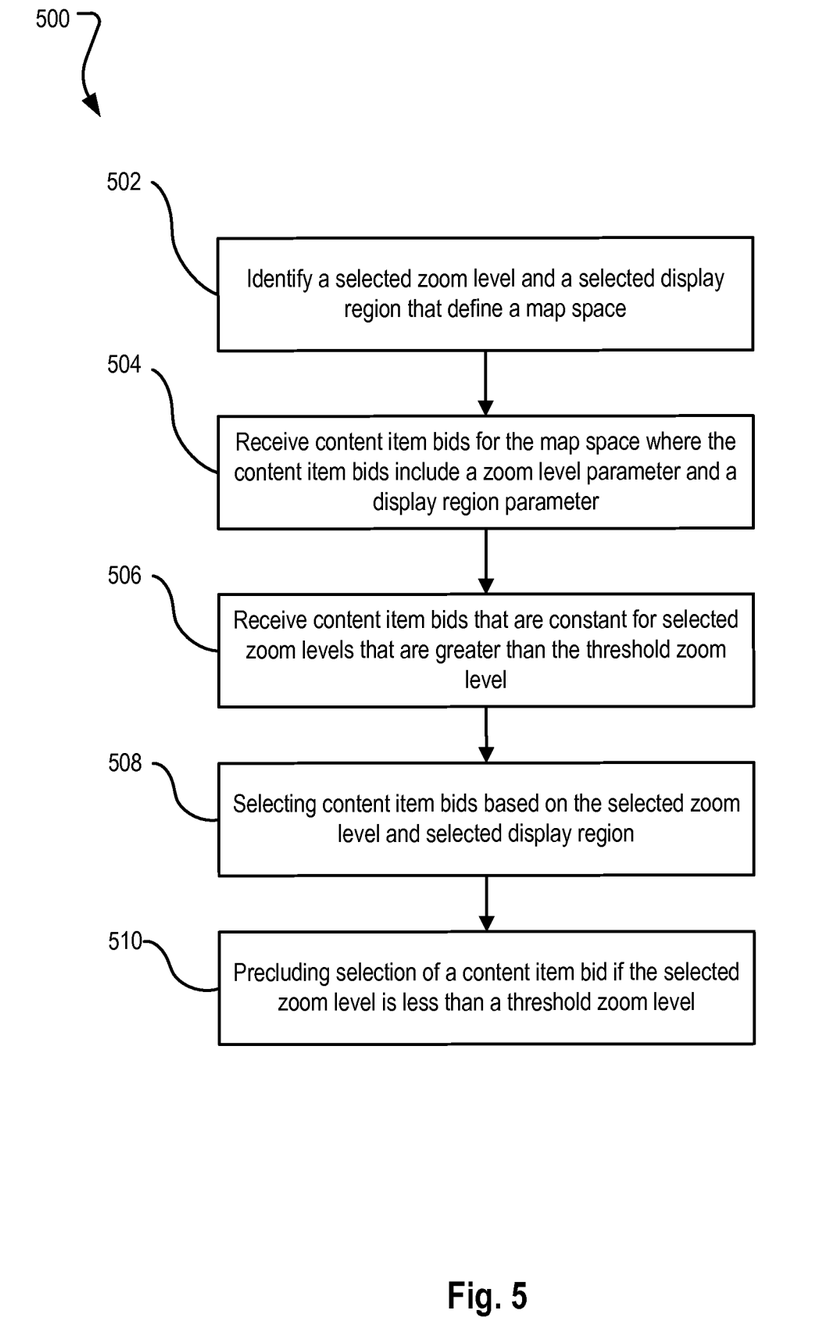
FIG. 5 is a flowchart illustrating another implementation of an alternate example process for selecting advertisements for a map space.

FIG. 5 is a flowchart illustrating an implementation of an alternate example process 500 for selecting content items for a map space. The process 500, for example, can be implemented in the environment 100. The process 500 can be implemented in conjunction with the process 300 and/or the process 400.

Stage 502 identifies a selected zoom level and a selected display region that define a map space. The selected zoom level can define the level of detail that can be displayed in the map space 202, while the selected display region 202 can define the area of the display allocated to presenting the map space 202. The selected zoom level and selected display region 202 can be identified, for example, by the map server 112.

Stage 504 receives advertisement bids for the map space where the advertisement bids each include a zoom level parameter and a display region parameter. The advertisement bids can be received, for example, by the advertisement server 104.

Stage 506 receives content item bids that are constant for selected zoom levels that are greater than the threshold zoom level. The content item bids can be advertisement bids that can be received as individual bids corresponding to a selected zoom level and selected display region or as a bid and a threshold zoom level. The advertisement bids can be received for example, by the advertisement server 104.

Stage 508 selects content item bids based on the selected zoom level and selected display region. The content item bids can be advertisement bids that can be selected based on the results of an auction. An auction can be conducted based only on advertisements bids having zoom level and display region 202 parameters corresponding to the map space 202 selected for presentation. Alternatively, the auctions can be based on additional information such as ad quality or user specific data. The advertisement bids can be selected, for example, by the advertisement server 104.

Stage 510 precludes selection of a content item bid if the selected zoom level is less than a threshold zoom level. Content item bids can be advertisement bids that can include threshold zoom level information that will prevent an advertisement bid from being considered in an auction for map space 202 having a selected zoom level less than the threshold. The selected zoom level can be compared to the zoom level threshold to determine if the advertisement bid should be precluded from selection. The advertisement bids can be precluded, for example by the advertisement server 104.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, by a data processing apparatus, a request for a map, the request including viewport data indicative of a map zoom level parameter at which the map will be presented at a user device;
    determining, by the data processing apparatus, a number of available content item spaces to be associated with the map;
    receiving, by the data processing apparatus, content item bids for the available content item spaces, the content item bids each being associated with a bid zoom level parameter;
    selecting, by the data processing apparatus, a portion of the content item bids, content item bids in the selected portion of the content item bids being associated with bid zoom level parameters that correspond with the map zoom level parameter indicated by the viewport data;
    selecting, by the data processing apparatus and based on values of the selected portion of the content item bids, data identifying content items for presentation in the number of available content item spaces associated with the map; and
    providing, by the data processing apparatus, the data identifying the content items that were selected for presentation in the number of available content item spaces.

2. The method of claim 1, wherein determining a number of available content item spaces to be associated with the map comprises determining the number of available content item spaces based, at least in part, on the map zoom level parameter.

3. The method of claim 1, wherein determining a number of available content item spaces to be associated with the map comprises determining the number of available content items spaces based, at least in part, on a size of a viewport in which the map will be presented.

4. The method of claim 1, wherein selecting a portion of the content item bids comprises:
    identifying a content item bid that is associated with a variable bid that varies in proportion to changes to the zoom level;
    determining that the variable bid is valid at the bid zoom level parameter; and
    selecting the content item bid for inclusion in the portion of the content item bids.

5. The method of claim 4, further comprising determining a minimum zoom level parameter at which content items will be presented with the map.

6. The method of claim 5, wherein determining a minimum zoom level parameter at which content items will be presented with the map comprises:
 obtaining click-through rates for advertisements at each of two or more different zoom level parameters;
 identifying one of the two or more zoom level parameters at which the click-through rate is less than a threshold click-through rate; and
 selecting, as the minimum zoom level parameter, the identified zoom level parameter.

7. The method of claim 6, further comprising associating the minimum zoom level parameter with one or more of the content item bids.

8. The method of claim 1, wherein each content item bid in the portion of content item bids is associated with a reference to a geographic location that is included in the map.

9. The method of claim 1, further comprising:
 receiving user requests for map directions, the map directions including one or more of a start location on the map and an end location on the map, wherein
 selecting data identifying content items for presentation in the number of available content item spaces associated with the map comprises selecting data identifying one or more content items that are relevant the start location on the map or the end location on the map.

10. The method of claim 9, further comprising:
 receiving path data defining directions from the start location on the map to the end location on the map, wherein
 selecting data identifying content items for presentation in the number of available content item spaces associated with the map comprises selecting data identifying one or more content items that have been identified as relevant to the path data.

11. A system, comprising:
 a data storage device content item bids for content items that are available for distribution with a map; and
 a data processing apparatus coupled to the data storage device, the data processing apparatus including instructions that upon execution cause the data processing apparatus to perform operations comprising:
  receiving a request for the map, the request including viewport data indicative of a map zoom level parameter at which the map will be presented at a user device;
  determining a number of available content item spaces to be associated with the map;
  receiving, from the data storage device, content item bids for the available content item spaces, the content item bids each being associated with a bid zoom level parameter;
  selecting a portion of the content item bids, content item bids in the selected portion of the content item bids being associated with bid zoom level parameters that correspond with the map zoom level parameter indicated by the viewport data;
  selecting, based on values of the selected portion of the content item bids, data identifying content items for presentation in the number of available content item spaces associated with the map; and
  providing the data identifying the content items that were selected for presentation in the number of available content item spaces.

12. The system of claim 11, wherein determining a number of available content item spaces to be associated with the map comprises determining the number of available content item spaces based, at least in part, on the map zoom level parameter.

13. The system of claim 11, wherein determining a number of available content item spaces to be associated with the map comprises determining the number of available content items spaces based, at least in part, on a size of a viewport in which the map will be presented.

14. The system of claim 11, wherein selecting a portion of the content item bids comprises:
 identifying a content item bid that is associated with a variable bid that varies in proportion to changes to the zoom level;
 determining that the variable bid is valid at the bid zoom level parameter; and
 selecting the content item bid for inclusion in the portion of the content item bids.

15. The system of claim 14, execution of the instructions cause the data processing apparatus to perform operations further comprising determining a minimum zoom level parameter at which content items will be presented with the map.

16. The system of claim 15, wherein determining a minimum zoom level parameter at which content items will be presented with the map comprises:
 obtaining click-through rates for advertisements at each of two or more different zoom level parameters;
 identifying one of the two or more zoom level parameters at which the click-through rate is less than a threshold click-through rate; and
 selecting, as the minimum zoom level parameter, the identified zoom level parameter.

17. The system of claim 16, execution of the instructions cause the data processing apparatus to perform operations further comprising associating the minimum zoom level parameter with one or more of the content item bids.

18. The system of claim 11, wherein each content item bid in the portion of content item bids is associated with a reference to a geographic location that is included in the map.

19. The system of claim 11, wherein execution of the instructions cause the data processing apparatus to perform operations further comprising:
 receiving user requests for map directions, the map directions including one or more of a start location on the map and an end location on the map, wherein
 selecting data identifying content items for presentation in the number of available content item spaces associated with the map comprises selecting data identifying one or more content items that are relevant the start location on the map or the end location on the map.

20. The system of claim 19, wherein execution of the instructions cause the data processing apparatus to perform operations further comprising:
 receiving path data defining directions from the start location on the map to the end location on the map, wherein
 selecting data identifying content items for presentation in the number of available content item spaces associated with the map comprises selecting data identifying one or more content items that have been identified as relevant to the path data.

21. A non-transitory computer storage medium encoded with a computer program, the program comprising instructions that when executed by data processing apparatus cause the data processing apparatus to perform operations comprising:

receiving a request for a map, the request including viewport data indicative of a map zoom level parameter at which the map will be presented at a user device;

determining a number of available content item spaces to be associated with the map;

receiving content item bids for the available content item spaces, the content item bids each being associated with a bid zoom level parameter;

selecting a portion of the content item bids, content item bids in the selected portion of the content item bids being associated with bid zoom level parameters that correspond with the map zoom level parameter indicated by the viewport data;

selecting, based on values of the selected portion of the content item bids, data identifying content items for presentation in the number of available content item spaces associated with the map; and providing the data identifying the content items that were selected for presentation in the number of available content item spaces.

22. The computer storage medium of 21, wherein determining a number of available content item spaces to be associated with the map comprises determining the number of available content item spaces based, at least in part, on the map zoom level parameter.

23. The computer storage medium of 21, wherein determining a number of available content item spaces to be associated with the map comprises determining the number of available content items spaces based, at least in part, on a size of a viewport in which the map will be presented.

24. The computer storage medium of 21, wherein selecting a portion of the content item bids comprises:

identifying a content item bid that is associated with a variable bid that varies in proportion to changes to the zoom level;

determining that the variable bid is valid at the bid zoom level parameter; and selecting the content item bid for inclusion in the portion of the content item bids.

25. The computer storage medium of 24, wherein execution of the instructions causes the data processing apparatus to perform operations further comprising determining a minimum zoom level parameter at which content items will be presented with the map.

26. The computer storage medium of 25, wherein determining a minimum zoom level parameter at which content items will be presented with the map comprises:

obtaining click-through rates for advertisements at each of two or more different zoom level parameters;

identifying one of the two or more zoom level parameters at which the click-through rate is less than a threshold click-through rate; and selecting, as the minimum zoom level parameter, the identified zoom level parameter.

27. The computer storage medium of 26, wherein execution of the instructions causes the data processing apparatus to perform operations further comprising associating the minimum zoom level parameter with one or more of the content item bids.

28. The computer storage medium of 21, wherein each content item bid in the portion of content item bids is associated with a reference to a geographic location that is included in the map.

29. The computer storage medium of 21, wherein execution of the instructions cause the data processing apparatus to perform operations further comprising:

receiving user requests for map directions, the map directions including one or more of a start location on the map and an end location on the map, wherein selecting data identifying content items for presentation in the number of available content item spaces associated with the map comprises selecting data identifying one or more content items that are relevant the start location on the map or the end location on the map.

30. The computer storage medium of 29, wherein execution of the instructions cause the data processing apparatus to perform operations further comprising:

receiving path data defining directions from the start location on the map to the end location on the map, wherein selecting data identifying content items for presentation in the number of available content item spaces associated with the map comprises selecting data identifying one or more content items that have been identified as relevant to the path data.

* * * * *

UNITED STATES PATENT AND TRADEMARK OFFICE
CERTIFICATE OF CORRECTION

PATENT NO. : 8,560,386 B2  
APPLICATION NO. : 13/486160  
DATED : October 15, 2013  
INVENTOR(S) : Brandon Badger, James E. Payne and Michael S. Perrow Page 1 of 1

It is certified that error appears in the above-identified patent and that said Letters Patent is hereby corrected as shown below:

In the Claims

Column 17, Line 21, Claim 22 – delete "of 21," and insert -- of claim 21, --, therefor.

Column 17, Line 26, Claim 23 – delete "of 21," and insert -- of claim 21, --, therefor.

Column 17, Line 31, Claim 24 – delete "of 21," and insert -- of claim 21, --, therefor.

Column 17, Line 40, Claim 25 – delete "of 24," and insert -- of claim 24, --, therefor.

Column 18, Line 1, Claim 26 – delete "of 25," and insert -- of claim 25, --, therefor.

Column 18, Line 12, Claim 27 – delete "of 26," and insert -- of claim 26, --, therefor.

Column 18, Line 17, Claim 28 – delete "of 21," and insert -- of claim 21, --, therefor.

Column 18, Line 21, Claim 29 – delete "of 21," and insert -- of claim 21, --, therefor.

Column 18, Line 33, Claim 30 – delete "of 29," and insert -- of claim 29, --, therefor.

Signed and Sealed this  
Fourth Day of February, 2014

Michelle K. Lee  
*Deputy Director of the United States Patent and Trademark Office*